United States Patent
Lee et al.

(10) Patent No.: US 8,645,726 B2
(45) Date of Patent: Feb. 4, 2014

(54) METHOD AND SYSTEM FOR LOAD SHARING IN A MULTIPLE POWER SUPPLY SYSTEM

(75) Inventors: Hsin-Chih Lee, Houston, TX (US); David P. Mohr, Spring, TX (US); Zachary J. Gerbozy, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 13/263,693

(22) PCT Filed: Apr. 30, 2009

(86) PCT No.: PCT/US2009/042428
§ 371 (c)(1),
(2), (4) Date: Oct. 7, 2011

(87) PCT Pub. No.: WO2010/126522
PCT Pub. Date: Nov. 4, 2010

(65) Prior Publication Data
US 2012/0029722 A1    Feb. 2, 2012

(51) Int. Cl.
G06F 1/26   (2006.01)
G06F 1/28   (2006.01)
H02J 1/10   (2006.01)

(52) U.S. Cl.
USPC ............. 713/300; 323/271; 323/272; 307/18; 307/24; 307/29; 307/43; 307/52; 363/65

(58) Field of Classification Search
USPC ....... 713/300; 323/271, 272; 363/65; 307/18, 307/24, 29, 43, 52, 60
See application file for complete search history.

(56) References Cited

U.S. PATENT DOCUMENTS

| | | | |
|---|---|---|---|
| 5,834,925 A * | 11/1998 | Chesavage | 323/272 |
| 6,317,345 B1 * | 11/2001 | Hayward et al. | 363/65 |
| 6,320,771 B1 * | 11/2001 | Hemena et al. | 363/70 |
| 6,894,466 B2 * | 5/2005 | Huang et al. | 323/272 |
| 7,209,518 B1 * | 4/2007 | Lubomirsky | 375/238 |
| 7,282,899 B1 * | 10/2007 | Daun-Lindberg et al. | 323/272 |

(Continued)

FOREIGN PATENT DOCUMENTS

| JP | 01-209924 | 8/1989 |
|---|---|---|
| KR | 100848297 | 7/2008 |

OTHER PUBLICATIONS

A. Tuladhar et al, "A Novel Control Technique to Operate DCDC Converters in Parallel With No Control Interconnections", Department of Electrical and Computer Engineering Unive.

(Continued)

*Primary Examiner* — Glenn A Auve

(57) ABSTRACT

Method and system for load sharing in a multiple power supply system. At least some of the illustrative embodiments are power supply units including a switching circuit, a coarse adjustment circuit coupled to the switching circuit (the coarse adjustment circuit configured to send an internal command to the switching circuit to modify a pulse width modulated signal that controls output current of the power supply unit), and a communication port coupled to the switching circuit. The power supply unit configured to receive from an external device over the communication port an external command to modify the pulse width modulated signal of the switching circuit. The power supply unit is also configured to modify the output current, the amount of modification based on the external command, and the internal command from the coarse adjustment circuit.

15 Claims, 3 Drawing Sheets

(56) References Cited

U.S. PATENT DOCUMENTS

| | | | |
|---|---|---|---|
| 2004/0174149 A1* | 9/2004 | Agari et al. | 323/271 |
| 2006/0239046 A1* | 10/2006 | Zane et al. | 363/65 |
| 2007/0150767 A1* | 6/2007 | Motomiya et al. | 713/300 |
| 2007/0226524 A1* | 9/2007 | Nakamura et al. | 713/300 |
| 2008/0231342 A1* | 9/2008 | Tabaian et al. | 327/512 |

OTHER PUBLICATIONS

David J. Parreault et. al., "Frequency-Based Current-Sharing Techniques for Paralleled Power Converters" 1998 IEEE Transactions on Power Electronics, vol. 13, pp. 626-634, Jul. 1998.

David J. Perreault et. al., "Implementation and Evaluation of Frequency-Based Current-Sharing Technique for Cellular Converter Systems" 1996 IEEE AREICON, vol. 2, pp. 682-686 Sep. 1996.

Jung-Won Kim et al., "A Novel Droop Method for Converter Parallel Operation", IEEE Transactions on Power Electronics, vol. 17, No. 1, Jan. 2002, pp. 25-32.

Shiguo Luo et al., "A Classification and Evaluation of Paralleling Methods for Power Supply Modules", Center for Power Electronics Systems, The Bradley Department of Electrical and Computer Engineering Virginia Polytechnic Institute and State University.

T.F. Wu et. al., "Reliability Improvement in Parallel Connected Converter Systems" 1991 IEEE, Industrial Electronics, Control and Instrumentation Conference, pp. 429-434, Nov. 1991.

Unitrode, "Load Share Controller", SLUS232—Feb. 1999, pp. 1-6.

* cited by examiner

METHOD AND SYSTEM FOR LOAD SHARING IN A MULTIPLE POWER SUPPLY SYSTEM

BACKGROUND

Many electronic systems, such as rack server systems or data storage systems, require large amounts of power to operate. In some cases, the large amounts of power are provided by plurality of power supplies connected together in parallel. The load is split between the plurality of power supplies; however, in the event that one power supply fails, the remaining power supplies provide the additional power to keep the system operational. When the load is split between the plurality of power supplies, it is desirable to balance and regulate the load among the plurality of power supplies.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Droop Sharing Circuit" shall mean a load sharing circuit within a power supply that adjusts output current of the power supply that is within a multiple power supply system based on a fixed reference voltage and a monitored output voltage of the power supply.

"Active Current Sharing Circuit" shall mean a load sharing circuit within a power supply that adjusts output current of the power supply within a multiple power supply system based on a reference signal shared among the power supplies (e.g., the reference voltage indicative of the highest output current of multiple power supplies) and the actual output current of the power supply.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
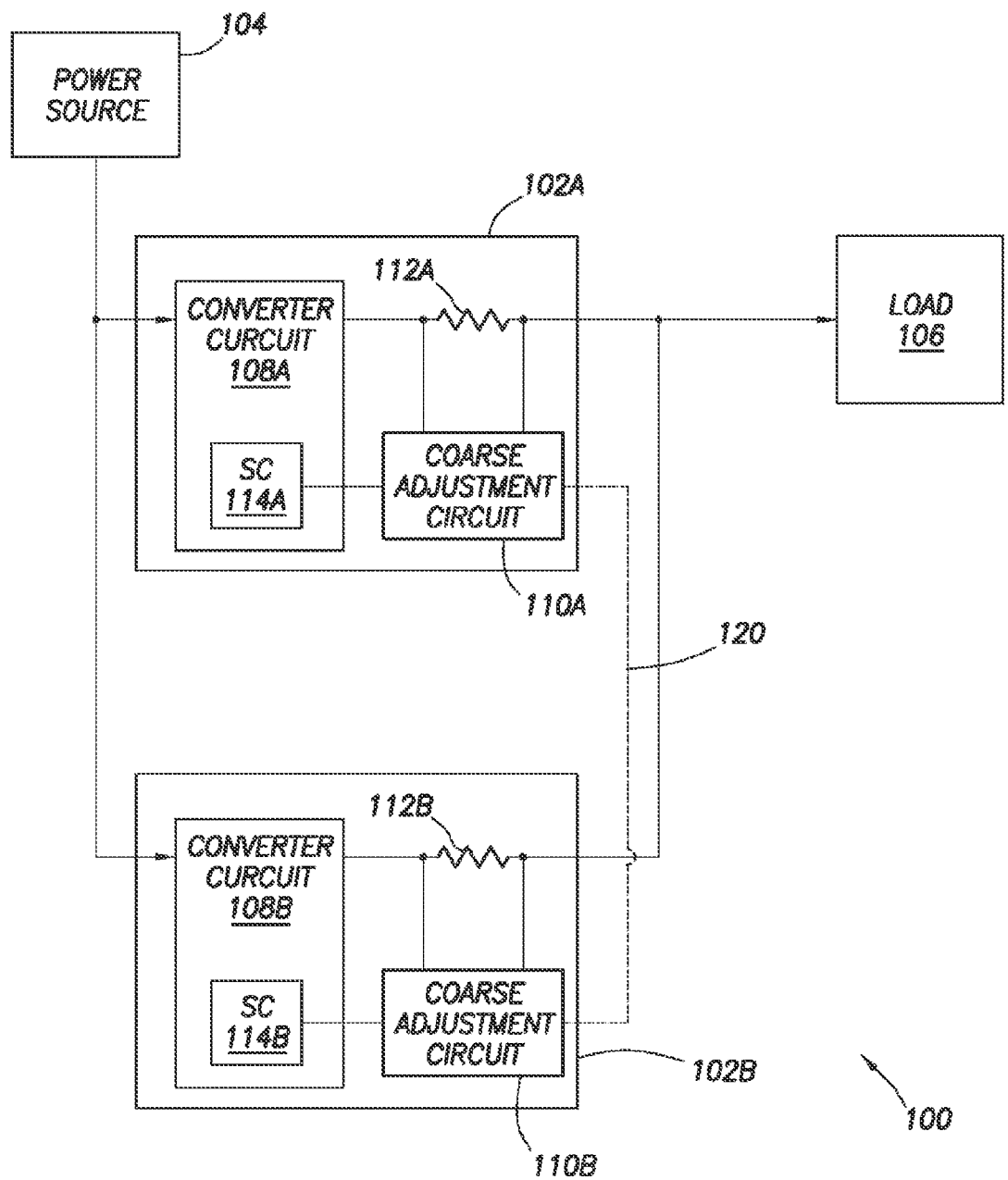
FIG. 1 shows a power supply system in accordance with at least some of the embodiments.

FIG. 1 shows an illustrative power supply system 100 in accordance with at least some of the embodiments. In particular, the power supply system 100 comprises a first power supply unit 102A and a second power supply unit 102B electrically coupled in parallel. The first power supply unit 102A and the second power supply unit 102B supply power to one or more power consuming devices, collectively referred to as load 106. While FIG. 1 shows the power supply system 100 with two power supply units 102, two or more of power supply units may equivalently be present in the power supply system 100. In at least some of the embodiments, each of the power supply units 102 supplies direct current (DC) power at its output, and thus the load 106 utilizes DC power for its operation. FIG. 1 further shows that each of the power supply units 102 couples to a power source 104. In some embodiments, the power source 104 may be a DC source, meaning that the power supply units 102 each contain a DC-DC converter circuit. In other embodiments, the power source 104 may be an alternating current (AC) signal, meaning that the power supply units 102 each contain an AC-DC converter circuit. In at least some of the embodiments, the power supply units 102 are configured to provide redundancy in case one of the power supply units 102 fails. It is desirable that the total power supplied to the load 106 be substantially evenly divided among the various power supply units 102.

In order to convert the source power to DC power fed to the load, and to control output power, each of the power supply units 102 comprises a converter circuit 108 (with a switching control (SC) circuit 114) and a coarse adjustment circuit 110 coupled to the converter circuit. Adjustments to output power are made by the converter circuit 108 (and more particularly the switching circuit 114) based, at least in part, on internal commands sent to the converter circuit 108 from the coarse adjustment circuit 110. In particular, in some embodiments the coarse adjustment circuit is a droop sharing circuit. In the droop sharing embodiments, the coarse adjustment circuit monitors output voltage of the power supply 102 relative to a fixed reference voltage, and the coarse adjustment circuit sends internal commands to the converter circuit 108 to adjust output voltage (which in turn adjusts output current).

In other embodiments, the coarse adjustment circuit 110 is an active current sharing circuit. In the active current sharing embodiments, the coarse adjustment circuit 110 couples to the other power supplies by way of a reference signal 120. In these embodiments, the reference signal 120 has a value indicative of the highest output current supplied by any of the multiple power supplies 102. If a particular power supply output current is less than the highest output current, the coarse adjustment circuit 110 sends commands to the converter circuit to increase output voltage in an attempt to balance the current between the supplies. In the embodiments illustrated, output current for each power supply is measured by the coarse adjustment circuit 110 coupling to and measuring the voltage developed across a resistor 112 coupled in series with the flow of the output current, and the resistor 112 has a substantially small value (e.g., 0.01 ohm or less). The differential voltage developed across the resistor 112 is indicative of output current of the respective converter circuit 108, and the output voltage is inversely proportional to the output current. Other mechanisms to measure output current, for example Hall-Effect sensors and current transformers, may be equivalently used.

Regardless of the type of coarse adjustment circuit, the switching circuit 114 receives commands from the coarse adjustment circuit 110 to change to the output voltage, and the switching circuit 114 changes the output voltage by modifying an output control signal. In some embodiments, the output control signal is modulated using modulation schemes, such as Pulse Width Modulation (PWM), Phase Shift Modulation (PSM), or Frequency Modulation (FM). Consider for the purpose of explanation, that the output control signal for the power supply units 102 is modulated using PWM scheme. The switching circuit 114 then changes the output voltage by modifying duty cycle of the pulse width modulated (PWM) signal that controls the output voltage of the respective converter circuit 108. Although the exemplary embodiments discuss changing the output voltage by modifying the PWM signal, the output voltage may be changed by modifying any signal that controls the output voltage, such as a reference voltage for a linear voltage regulator. Modifying the duty cycle of the PWM signal adjusts the output voltage of the respective converter circuit 108, thus proportionally adjusting the output current of the converter circuit 108. The adjusting of the output current of the converter circuits 108 enables the power supply system 100 to provide power to the load 106 that is substantially evenly divided among the various power supply units 102. In the exemplary embodiment, the illustrative power supply system 100 assures load balancing within approximately 10%. For example, after the adjustment the output current (i.e., by proportionally adjusting the output voltage by modifying the duty cycle of the PWM signal) of the power supply unit 102A in the illustrative power supply system 100 is within approximately 10% of the output current of the power supply unit 102B. However, an approximately 10% load difference between power supply units is significant when supplying large loads.

Figure 2:
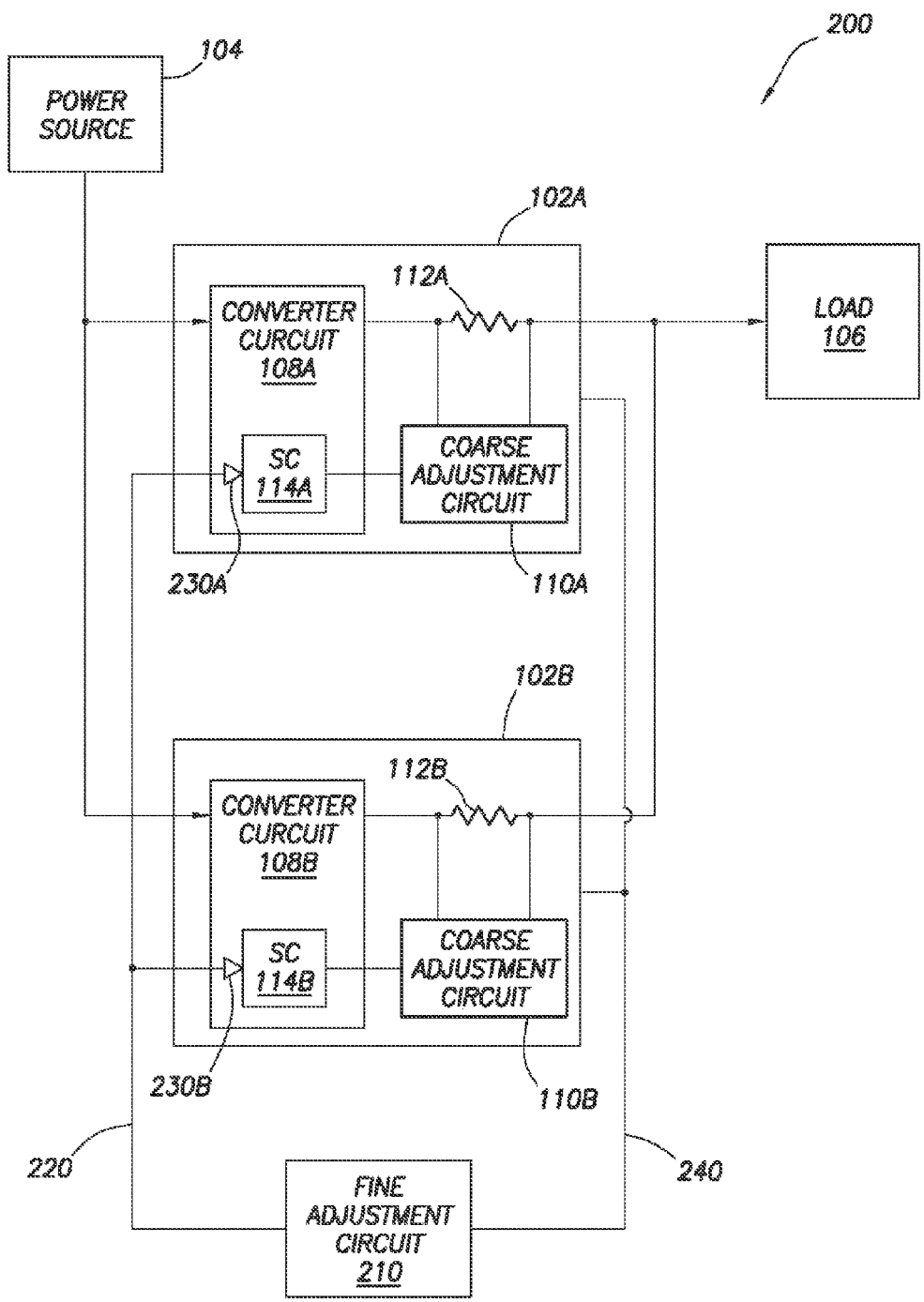
FIG. 2 shows a power supply system with a fine adjustment circuit in accordance with at least some of the embodiments.

FIG. 2 shows a power supply system 200 that achieves better load sharing as between the power supply units. In particular, FIG. 2 shows a power supply system 200 similar to the embodiments of FIG. 1, but also having a fine adjustment circuit 210. The power supply system 200 comprises a first power supply unit 102A and a second power supply unit 102B electrically coupled in parallel to supply power to the load 106. While FIG. 2 shows the power supply system 200 with two power supply units 102, two or more power supply units 102 may be equivalently present in the power supply system 200. Each of the power supply units 102 comprise coarse adjustment circuit 110 (e.g., a droop sharing circuit or an active current sharing circuit) that measures output current. As illustrated, the coarse adjustment circuits 110 measure output current by way of a series resistor 112, but other current measurement mechanisms may be used. In the illustrative case of a series resistor, the voltage developed across resister 112 is indicative of the output current of the converter circuit 108, and as in the previous embodiments the coarse adjustment circuit 110 sends an internal command to the switching circuit 114 to modify an output control signal that controls the output voltage (which in turn adjusts output current) of the respective converter circuit 108 when needed. Consider for the purpose of explanation, that the output control signal of the power supply units 102 is modulated using PWM scheme. The switching circuit 114 then modifies the PWM signal that controls the output voltage of the respective converter circuit 108 when needed. In the particular embodiment, the coarse adjustment circuits 110 are analog circuits. In other embodiments, the coarse adjustment circuits 110 are digital.

The power supply system 200 also comprises a fine adjustment circuit 210, and in some embodiments the fine adjustment circuit 210 is external to the power supply units 102. The fine adjustment circuit 210 is communicatively coupled with each of the power supply units 102 by way of a communication channel 240. In particular, fine adjustment circuit 210 communicatively couples to the switching circuits 114 of the power supply units 102 by the communication channel 220 and a corresponding communication port 230. Although the exemplary embodiments of FIG. 2 illustrate two communication channels 220 and 240, in other embodiments the fine adjustment circuit 210 may communicatively couple to the power supply units 102 and the switching circuits 114 by way of the same communication channel. In some embodiments, the communication channels 220 and 240 are a digital serial communication bus (e.g., an Inter-Integrated Circuit ($I^2C$), a Universal Asynchronous Receiver/Transmitter (UART), or a Universal Serial Bus (USB)). In other embodiments, the communication channels 220 and 240 may be any communication channel, such as a wireless communication channel. The fine adjustment circuit 210 is configured to receive from each of the power supply units 102 a value indicative of the output current of the respective power supply 102. Based on the values indicative of the output currents, and if needed, the fine adjustment circuit 210 sends an external command over the communication channel 220 to the switching circuits 114 to modify the output voltage (which in turn adjusts output current) of the respective converter circuit 108. Thus, in the particular embodiment, each switching circuit 114 receives an internal command from its coarse adjustment circuit 110, and an external command from the fine adjustment circuit 210. The switching circuits 114 adjust the output voltage of the respective converter circuit 108 based on the internal commands and the external commands.

The fine adjustment circuit 210 calculates a difference between the values indicative of the output currents of the converter circuits 108, and determines if the calculated difference is greater than a predetermined threshold. In at least some of embodiments, the predetermined threshold is based at least on the power supply units 102, and is indicative of an upper limit in the calculated difference. If the calculated difference between the values indicative of output current of the converter circuits 108 is less than the predetermined threshold, then the fine adjustment circuit 210 does not send an external command to the switching circuits 114 to modify the output voltages of the converter circuits 108. Stated otherwise, load is substantially equally shared by the two power supply units 102.

If the calculated difference between the values indicative of output current of the converter circuits 108 is greater than the predetermined threshold (e.g., 0.1%-3%), then the fine adjustment circuit 210 compares the calculated difference with a predetermined current step value. The predetermined current step value is based at least on the power supply units 102. In particular, the fine adjustment circuit 210 compares the calculated difference with the predetermined current step value to determine if the calculated difference is greater than or less than the predetermined current step value. In at least some of the embodiments, based on the comparison between the calculated difference and the predetermined current step value, the fine adjustment circuit 210 utilizes one of two different schemes to determine an amount of modification to be applied to, for example, the PWM signals that control the output voltages (which in turn adjusts output currents) of the converter circuits 108.

If the calculated difference is greater than the predetermined current step value, then the fine adjustment circuit 210 determines an amount of modification for each of the power supply units 102. Consider for the purpose of explanation, the power supply system 200 with two power supply units 102A-B as illustrated in FIG. 2 and the output control signal that controls the output voltage (which in turn adjusts output current) of the respective converter circuit 108 is modulated using PWM scheme. If the value indicative of the output current of the power supply 102A was higher than the value indicative of the output current of the power supply unit 102B, then the amount of modification (e.g., based on the preset equation) subtracts from the duty cycle of the PWM signal that controls output voltage of the power supply unit 102A, and adds to the duty cycle of the PWM signal that controls output voltage of the power supply unit 102B. The fine adjustment circuit 210 sends an external command by the communication channel 220 to the power supply units 102 to provide the power supply units 102 with their respective amount of modification. In particular example, the switching circuit 114A receives the external command over the communication port 230A, and switching circuit 114B receives the external command over the communication port 230B.

The switching circuits 114 modify the PWM signals that control the output voltages (which in turn adjusts output currents) of the respective converter circuit 108 based on the amount of modification provided by the external command from the fine adjustment circuit 210 and the internal command from its coarse adjustment circuit 110. Continuing with the exemplary embodiment of FIG. 2, the switching circuit 114A modifies the duty cycle of the PWM signal of the converter circuit 108A based on the external command from the fine adjustment circuit 210 (i.e., subtract from the duty cycle) and internal command from the coarse adjustment circuit 110A, and the switching circuit 114B modifies the duty cycle of the PWM signal of the converter circuit 108B based on the external command from the fine adjustment circuit 210 (i.e., add to the duty cycle) and internal command from the coarse adjustment circuit 110B. By modifying the duty cycle of the PWM signals, the switching circuits 114 control the output voltage of the power supply units 102, and in turn control the output current of the power supply units 102.

If the calculated difference is less than the predetermined current step value, then the fine adjustment circuit 210 determines that the amount of modification to be a set value based on the value indicative of the output current. Consider again the exemplary embodiment of FIG. 2, if the value indicative output current of the power supply 102A was higher than the value indicative of the output current of the power supply unit 102B, then the amount of modification would decrease the duty cycle of the PWM signal that controls output voltage (which in turn adjusts output current) of the power supply unit 102A by the set value (e.g., 0.33%), and increase the duty cycle of the PWM signal that controls output voltage (which in turn adjusts output current) of the power supply unit 102B by the set value (e.g., 0.33%). The fine adjustment circuit 210 sends an external command by the communication channel 220 to the power supply units 102 to provide the power supply units 102 with their respective amount of modification. In particular example, the switching circuit 114A receives the external command over the communication port 230A, and switching circuit 114B receives the external command over the communication port 230B.

The switching circuits 114 modify the PWM signals that control the output voltages of the respective converter circuit 108 based on the amount of modification provided by the external command from the fine adjustment circuit 210 and the internal command from its coarse adjustment circuit 110. Continuing with the exemplary embodiment, the switching circuit 114A modifies the duty cycle of the PWM signal of the converter circuit 108A based on the external command from the fine adjustment circuit 210 (i.e., decreases the duty cycle) and internal command from the coarse adjustment circuit 110A, and the switching circuit 114B modifies the duty cycle of the PWM signal of the converter circuit 108B based on the external command from the fine adjustment circuit 210 (i.e., increases the duty cycle) and internal command from the coarse adjustment circuit 110B. By modifying the duty cycle of the PWM signals, the switching circuits 114 control the output voltage of the power supply units 102, and in turn control the output current of the power supply units 102.

In accordance with the various embodiments, regardless of the scheme utilized by the fine adjustment circuit 210 to determine the amount of modification, the fine adjustment circuit 210 sends an external command to the switching circuits 114 of the power supply units 102, and the switching circuits 114 adjust the output voltage (which in turn adjusts output current) of the power supply units 108 based on the internal command of its coarse adjustment circuit 110, and the external command from the fine adjustment circuit 210.

Figure 3:
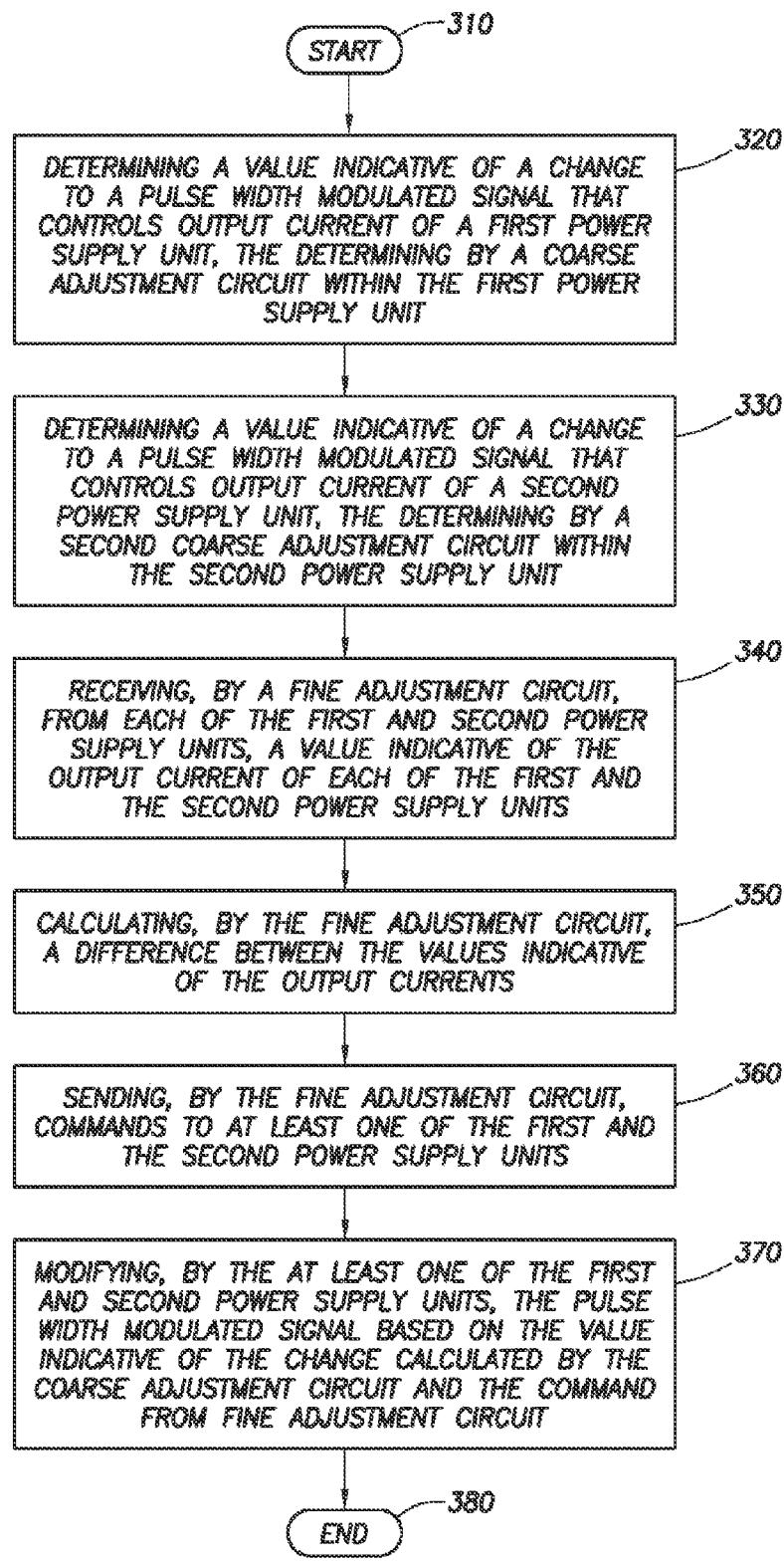
FIG. 3 shows a method in accordance with at least some of the embodiments.

FIG. 3 shows a method in accordance with at least some of the embodiments. In particular, the method starts (block 310) and the proceeds to determining a value indicative of a change to a pulse width modulated signal that controls output current of a first power supply unit, the determining by a first coarse adjustment circuit within the first power supply unit (block 320). Next, a value indicative of a change to a pulse with modulated signal that controls output current of a second power supply unit is determined, the value is determined by a second coarse adjustment circuit within the second power supply unit (block 330). In at least some of the embodiments, the first and the second power supply unit are electrically coupled in parallel and comprised in a power supply system as shown in the embodiments of FIG. 2. Thereafter, a value indicative of the output current of each of the first and the second power supply units is received by a fine adjustment circuit (block 340).

Next, a difference between the values indicative of output currents is calculated by the fine adjustment circuit (block 350), and a command is sent by the fine adjustment circuit to at least one of the first and the second power supply unit (block 360). Finally, the pulse width modulated signal is modified, by the at least one of the first and the second power supply units, based on the value indicative of the change calculated by the coarse adjustment circuit and the command from fine adjustment circuit (block 370), and the method ends (block 380). In at least some of the embodiments, the method illustrated in the embodiments of FIG. 3 may be repeated until the difference between values indicative of output currents of the first and the second power supply unit is less than a predetermined threshold.

The above discussion is meant to be illustrative of the principles and various embodiments of the present invention. Numerous variations and modifications will become apparent to those skilled in the art once the above disclosure is fully appreciated. For example, while the fine adjustment circuit is shown external to the power supplies 102, in other embodiments the fine adjustment circuit may reside within one of the power supplies 102. Moreover, the various embodiments are related to the output voltage control signal being modulated using Pulse Width Modulation scheme; however, any modulation scheme such as, Phase Shift Modulation (PSM), or Frequency Modulation (FM) may be equivalently used. It is intended that the following claims be interpreted to embrace all such variations and modifications.

What is claimed is:

1. A system comprising:
   a first power supply unit comprising a first coarse adjustment circuit configured to adjust output current of the first power supply unit;
   a second power supply unit coupled to the first power supply unit, the second power supply unit comprising a second coarse adjustment circuit configured to adjust output current of the second power supply unit; and
   a fine adjustment circuit communicatively coupled to the first and the second power supply units, the fine adjustment circuit configured to receive values indicative of the output currents of the first and the second power supply units;
   wherein the fine adjustment circuit further configured to calculate a difference in the values indicative of the output currents, compare the difference to a first threshold, and based on the difference being greater than the first threshold, compare the difference to a current step value, and the fine adjustment circuit configured to send a command to at least one of the first and the second power supply units to modify the output current, an amount of modification based on a relation of the difference in the values indicative of the output currents to the current step value; and
   wherein the at least one of the first and the second power supply units is configured to modify output current responsive to its respective coarse adjustment circuit, and configured to adjust output current responsive to the command from the fine adjustment circuit.

2. The system as defined in claim 1 wherein the fine adjustment circuit further configured to send a command to at least one of the first and the second power supply units to modify duty cycle of a pulse width modulated signal that controls the output current.

3. The system as defined in claim 1 wherein the fine adjustment circuit further configured to send a command to at least one of the first and second power supply units to increase or decrease duty cycle of a pulse width modulated signal that controls the output current based on the values indicative of the output currents.

4. The system as defined in claim 1 wherein the first and the second coarse adjustment circuit is an analog load sharing circuit.

5. The system as defined in claim 4 wherein the analog load sharing circuit is one selected from the group consisting of: a droop sharing circuit; and an active current sharing circuit.

6. The system as defined in claim 1 wherein the fine adjustment circuit is communicatively coupled to the first and the second power supply units by any one or more selected from the group consisting of: an Inter-Integrated Circuit (I²C) serial communication bus; a Universal Asynchronous Receiver/Transmitter (UART); and a Universal Serial Bus (USB).

7. A method comprising:
   determining a value indicative of a change to a pulse width modulated signal that controls output current of a first power supply unit, the determining by a first coarse adjustment circuit within the first power supply unit;
   determining a value indicative of a change to a pulse width modulated signal that controls output current of a second power supply unit, the determining by a second coarse adjustment circuit within the second power supply unit;
   receiving, by a fine adjustment circuit, from each of the first and second power supply units, a value indicative of the output current of each of the first and the second power supply unit;
   calculating, by the fine adjustment circuit, a difference between the values indicative of the output currents;
   comparing, by the fine adjustment circuit, the difference between the values indicative of the output currents to a threshold;
   comparing, by the fine adjustment circuit, based on the difference being greater than the first threshold the difference between the values indicative of the output currents to a current step value;
   determining, by the fine adjustment circuit, an amount of modification to be applied based on a relation of the difference between the values indicative of the output currents and the current step value;
   sending, by the fine adjustment circuit, commands to at least one of the first and the second power supply units the amount of modification to be applied; and
   modifying, by the at least one of the first and the second power supply units, the pulse width modulated signal based on the value indicative of the change calculated by the coarse adjustment circuit and the command from fine adjustment circuit.

8. The method as defined in claim 7 further comprising before the sending by the fine adjustment circuit, determining if the difference between the values indicative of output currents is greater than a predetermined current step value.

9. The method as defined in claim 8 wherein if the difference is greater than the predetermined current step value, then sending by the fine adjustment circuit a command to at least one of the first and the second power supply unit to modify duty cycle of the pulse width modulated signal.

10. The method as defined in claim 8 wherein if the difference is less than the predetermined current step value, then sending by the fine adjustment circuit a command to at least one of the first and the second power supply units to increase or decrease duty cycle of the pulse width modulated signal.

11. The method as defined in claim 7 further comprising repeating the determining, the receiving, the calculating, and the modifying until the difference between the values indicative of output currents is less than a predetermined threshold.

12. The method as defined in claim 7 wherein the coarse adjustment circuit is an analog load sharing circuit selected from the group consisting of: a droop sharing circuit; and an active current sharing circuit.

13. A power supply unit comprising:
   a switching circuit;
   a coarse adjustment circuit coupled to the switching circuit, the coarse adjustment circuit configured to send an internal command to the switching circuit to modify a pulse width modulated signal that controls output current of the power supply unit; and
   a communication port coupled to the switching circuit;
   wherein the power supply unit configured to receive from an external device over the communication port an external command to modify the pulse width modulated signal of the switching circuit;
   wherein the command to modify includes a relationship between a current step value and a difference between the output current of the switching circuit and an output current of a second switching circuit, further based on the difference between the output current of the switching circuit and the output current of the second switching circuit being greater than a threshold; and wherein the power supply unit is configured to modify the output current, the amount of modification based on the external command, and the internal command from the coarse adjustment circuit.

14. The power supply as defined in claim 13 wherein the power supply unit further configured to receive a command to modify duty cycle of the pulse width modulated signal.

15. The power supply as defined in claim 13 wherein the coarse adjustment circuit is an analog load sharing circuit selected from the group consisting of: a droop sharing circuit; and an active current sharing circuit.

* * * * *